(12) United States Patent
Hadley et al.

(10) Patent No.: US 8,607,570 B2
(45) Date of Patent: Dec. 17, 2013

(54) AIRBLOWN SYNGAS FUEL NOZZLE WITH DILUENT OPENINGS

(75) Inventors: Mark Allan Hadley, Greenville, SC (US); John Lipinski, Simpsonville, SC (US); Jesse Ellis Barton, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 885 days.

(21) Appl. No.: 12/436,445

(22) Filed: May 6, 2009

(65) Prior Publication Data
US 2010/0281871 A1    Nov. 11, 2010

(51) Int. Cl.
*F23R 3/28*    (2006.01)

(52) U.S. Cl.
USPC .................................. 60/740; 60/737; 60/742

(58) Field of Classification Search
USPC ..................... 60/740, 742, 748, 737
See application file for complete search history.

(56) References Cited

U.S. PATENT DOCUMENTS

| 3,735,930 | A | * | 5/1973 | Mori ........................ 239/419.5 |
| 3,763,650 | A | * | 10/1973 | Hussey et al. ............... 60/39.463 |
| 4,154,567 | A | * | 5/1979 | Dahmen ...................... 431/5 |
| 5,158,443 | A | | 10/1992 | Miyake |
| 5,240,410 | A | | 8/1993 | Yang et al. |
| 5,261,602 | A | | 11/1993 | Brent et al. |
| 5,288,021 | A | * | 2/1994 | Sood et al. ................ 239/132.5 |
| 5,351,489 | A | * | 10/1994 | Okamoto et al. ............. 60/740 |
| 5,411,394 | A | | 5/1995 | Beer et al. |
| 5,451,160 | A | | 9/1995 | Becker |
| 5,882,184 | A | | 3/1999 | Feldermann |
| 5,941,698 | A | | 8/1999 | Darling et al. |
| 5,987,889 | A | * | 11/1999 | Graves et al. ............... 60/748 |
| 6,082,113 | A | * | 7/2000 | Prociw et al. ............... 60/748 |
| 6,405,536 | B1 | * | 6/2002 | Ho et al. ..................... 60/742 |
| 6,499,993 | B2 | | 12/2002 | Steber et al. |
| 6,532,726 | B2 | | 3/2003 | Norster et al. |
| 6,622,944 | B1 | | 9/2003 | Hurley et al. |
| 6,684,640 | B2 | | 2/2004 | McMillan et al. |
| 6,786,046 | B2 | * | 9/2004 | Wiebe et al. ................ 60/737 |
| 6,866,503 | B2 | | 3/2005 | Ladharam |
| 6,898,937 | B2 | * | 5/2005 | Stuttaford et al. ........... 60/737 |

(Continued)

FOREIGN PATENT DOCUMENTS

| EP | 1736707 A1 | 12/2006 |
| JP | 10238776 A | 9/1998 |
| WO | 2008057685 A2 | 5/2008 |

OTHER PUBLICATIONS

DE Office Action for related application 102010016702.9 dated Jan. 19, 2011.

(Continued)

*Primary Examiner* — William H Rodriguez
*Assistant Examiner* — Carlos A Rivera
(74) *Attorney, Agent, or Firm* — Armstrong Teasdale LLP (57) ABSTRACT

A fuel nozzle tip for use with a combustor and a method of assembling the fuel nozzle tip are provided. The fuel nozzle tip includes a fuel tube and an air collar coupled to the fuel tube. The fuel tube includes a first plurality of circumferentially-spaced fuel openings and a second plurality of circumferentially-spaced fuel openings. The fuel tube is configured to channel fuel into a mixing zone defined within the combustor. The air collar includes a plurality of circumferentially-spaced air openings configured to discharge air into the mixing zone.

20 Claims, 6 Drawing Sheets

(56) References Cited

U.S. PATENT DOCUMENTS

| | | | |
|---|---|---|---|
| 7,251,940 B2 * | 8/2007 | Graves et al. | 60/742 |
| 2006/0057518 A1 | 3/2006 | Aldrich | |
| 2006/0059915 A1 * | 3/2006 | Furletov et al. | 60/740 |
| 2006/0208105 A1 | 9/2006 | Prociw et al. | |
| 2007/0003897 A1 * | 1/2007 | Koizumi et al. | 431/354 |
| 2007/0048679 A1 | 3/2007 | Joshi et al. | |
| 2007/0107437 A1 | 5/2007 | Evulet et al. | |
| 2008/0054101 A1 * | 3/2008 | Prociw et al. | 239/406 |
| 2008/0078180 A1 * | 4/2008 | Durbin et al. | 60/776 |
| 2010/0089021 A1 * | 4/2010 | Barton et al. | 60/39.53 |
| 2010/0101204 A1 * | 4/2010 | Berry et al. | 60/39.53 |
| 2010/0170253 A1 * | 7/2010 | Berry et al. | 60/742 |

OTHER PUBLICATIONS

JPO Office Action for related application 2010-104698 dated Sep. 27, 2011.

* cited by examiner

AIRBLOWN SYNGAS FUEL NOZZLE WITH DILUENT OPENINGS

BACKGROUND OF THE INVENTION

The embodiments described herein relate generally to integrated gasification combined-cycle (IGCC) power generation systems and, more particularly, to fuel nozzles for use with an IGCC power generation system.

At least some known gasifiers convert a mixture of fluids, including air and/or oxygen, liquid water and/or steam, fuel, and/or a slag additive, into a partially oxidized gas that is often referred to as "syngas." Controlling the mixing of fluids delivered to a gas turbine engine may be critical to the engine's performance and/or emissions.

For example, improper and/or inadequate mixing may cause a flame to attach proximate to a fuel nozzle tip and/or within the nozzle, thereby increasing a temperature of the fuel nozzle tip and/or the nozzle. Moreover, improper and/or inadequate mixing may or may not create a separation zone in a center of a flow, thereby increasing or decreasing a probability of a vortex breakdown. Further, improper and/or inadequate mixing may cause the recirculation stability zone defined within the combustor to shift downstream, thereby detaching the flame and increasing the generation of carbon monoxide emissions.

BRIEF SUMMARY OF THE INVENTION

In one embodiment, a method of assembling a fuel nozzle tip for use with a combustor is provided. The method includes providing a fuel tube and coupling an air collar to the fuel tube. The fuel tube is formed with a first plurality of circumferentially-spaced fuel openings and a second plurality of circumferentially-spaced fuel openings. The fuel tube is oriented such that fuel may be discharged into a mixing zone through the first and second pluralities of fuel openings. The air collar is formed with a plurality of circumferentially-spaced air openings. The air collar is oriented such that air may be discharged into the mixing zone through the plurality of air openings.

In another embodiment, a fuel nozzle tip for use with a combustor is provided. The fuel nozzle tip includes a fuel tube and an air collar coupled to the fuel tube. The fuel tube includes a first plurality of circumferentially-spaced fuel openings and a second plurality of circumferentially-spaced fuel openings. The fuel tube is configured to channel fuel into a mixing zone defined within the combustor. The air collar includes a plurality of circumferentially-spaced air openings configured to discharge air into the mixing zone.

In yet another embodiment, a gas turbine engine for use in an integrated gasification combined-cycle (IGCC) power generation system is provided. The gas turbine engine includes a combustor and a fuel nozzle tip that includes a fuel tube and an air collar coupled to the fuel tube. The fuel tube includes a first plurality of circumferentially-spaced fuel openings and a second plurality of circumferentially-spaced fuel openings. The fuel tube is configured to channel fuel into a mixing zone defined within the combustor. The air collar includes a plurality of circumferentially-spaced air openings configured to discharge air into the mixing zone.

DETAILED DESCRIPTION OF THE INVENTION

The systems and methods described herein facilitate discharging a fuel-air mixture from a fuel nozzle that enables a rich flame to be produced while reducing flame-holding issues. Specifically, the systems and methods described herein facilitate discharging the fuel-air mixture from the fuel nozzle within a combustor mixing zone with a weak swirl.

Figure 1:
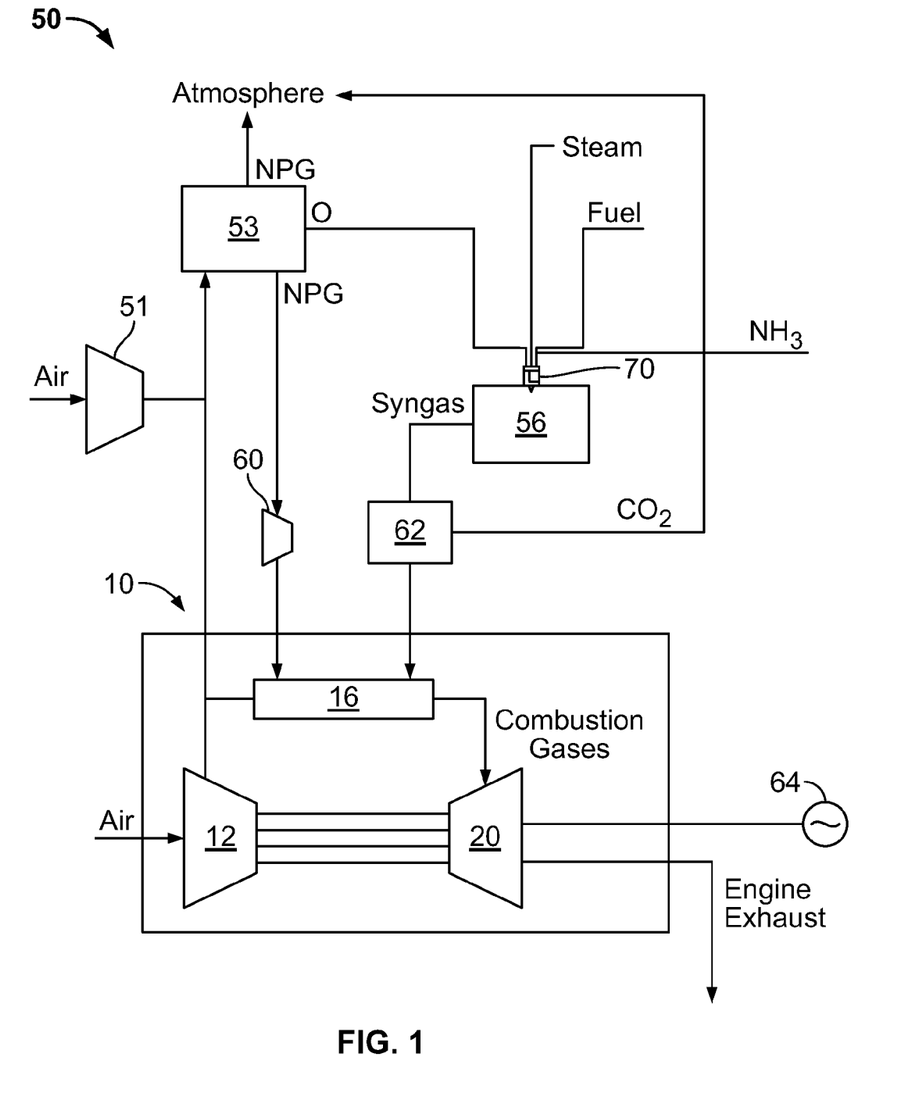
FIG. 1 is a schematic illustration of an exemplary integrated gasification combined-cycle (IGCC) power generation system.

FIG. 1 is a schematic illustration of an exemplary integrated gasification combined-cycle (IGCC) power generation system 50. In the exemplary embodiment, system 50 includes a main air compressor 51, an air separation unit 53, a gasifier 56, a clean-up device 62, and a gas turbine engine 10. In the exemplary embodiment, engine 10 includes a compressor 12, a combustor 16, and a turbine 20.

During operation, air flows through main air compressor 51, which discharges compressed air to air separation unit 53. In the exemplary embodiment, additional compressed air is supplied to air separation unit 53 from gas turbine engine compressor 12.

Air separation unit 53 separates the compressed air into an oxygen flow $O_2$ and a gas by-product flow NPG, also referred to as a process gas flow. In the exemplary embodiment, air separation unit 53 channels oxygen flow $O_2$ to gasifier 56, at least some of process gas flow NPG to gas turbine engine combustor 16 via a compressor 60, and at least some of process gas flow NPG to the atmosphere. In the exemplary embodiment, process gas flow NPG includes nitrogen. For example, in one embodiment, process gas flow NPG includes between about 90% and 100% nitrogen. Process gas flow NPG may also include other gases such as, but not limited to, oxygen and/or argon. Alternatively, the process gas flow includes ($H_2O$) steam in lieu of nitrogen, wherein the process gas flow includes between about 90% and 100% ($H_2O$) steam.

Gasifier 56 converts oxygen flow $O_2$ supplied by air separation unit 53, liquid water and/or steam, a mixture of fuel, a carbonaceous substance, and/or a slag additive into a partially oxidized gas that is often referred to as "syngas." Although gasifier 56 may use any fuel, in some embodiments, gasifier 56 uses coal, petroleum coke, residual oil, oil emulsions, tar sands, and/or other similar fuels. In the exemplary embodiment, gasifier 56 channels the syngas to gas turbine engine combustor 16 via a clean-up device 62. More specifically, in the exemplary embodiment, gasifier 56 generates a syngas that includes carbon dioxide $CO_2$, and clean-up device 62 separates carbon dioxide $CO_2$ from the syngas. Carbon dioxide $CO_2$ separated from the syngas by clean-up device 62 may be vented to the atmosphere, recycled to an injection nozzle 70 for use by gasifier 56, compressed and sequestered for geological storage (not shown), and/or processed for industrial use gases (not shown).

Figure 2:
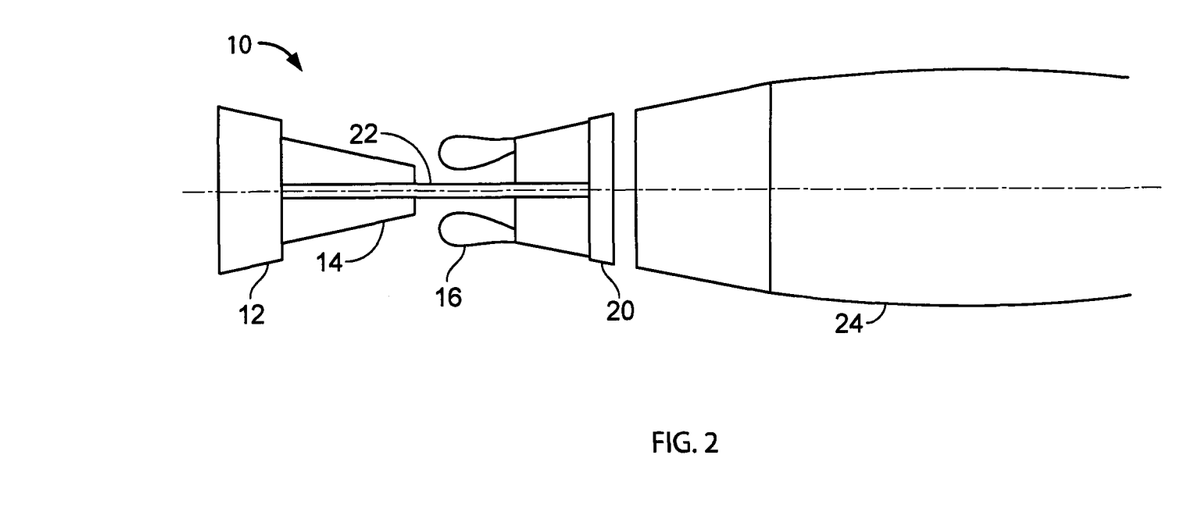
FIG. 2 is a schematic illustration of an exemplary gas turbine engine that may be used with the IGCC power generation system shown in FIG. 1.

FIG. 2 is a schematic illustration of engine 10 that may be used with system 50 shown in FIG. 1. In the exemplary embodiment, engine 10 includes a compressor 12, a combustor 16, and a turbine 20 arranged in a serial, axial flow relationship. Compressor 12 and turbine 20 are coupled together via a shaft 22. In an alternate embodiment, engine 10 includes a high pressure compressor and a high pressure turbine that are coupled together via a second shaft.

During operation, compressor 12 compresses air, and the compressed air is channeled to combustor 16. Combustor 16 mixes the compressed air from compressor 12, compressed process gas from air separation unit 53 (shown in FIG. 1), and syngas from gasifier 56 (shown in FIG. 1) to produce a mixture that is combusted to produce combustion gases that are directed towards turbine 20. The combustion gases are discharged through an exhaust nozzle 24, wherein the gases exit engine 10. In the exemplary embodiment, power output from engine 10 drives a generator 64 (shown in FIG. 1) that supplies electrical power to a power grid (not shown).

More specifically, in the exemplary embodiment, engine 10 also includes at least one fuel nozzle (not shown in FIG. 2), which channels the compressed air, compressed process gas, and the syngas to a combustor mixing zone 32 (shown in FIG. 3) defined within combustor 16. Combustor 16 combusts the compressed air, compressed process gas, and the syngas within combustor mixing zone 32 to produce combustion gases. In the exemplary embodiment, the use of the process gas flow facilitates controlling emissions from engine 10 and, more specifically, facilitates reducing a combustion temperature and a nitrous oxide emission level generated within engine 10.

Figure 3:
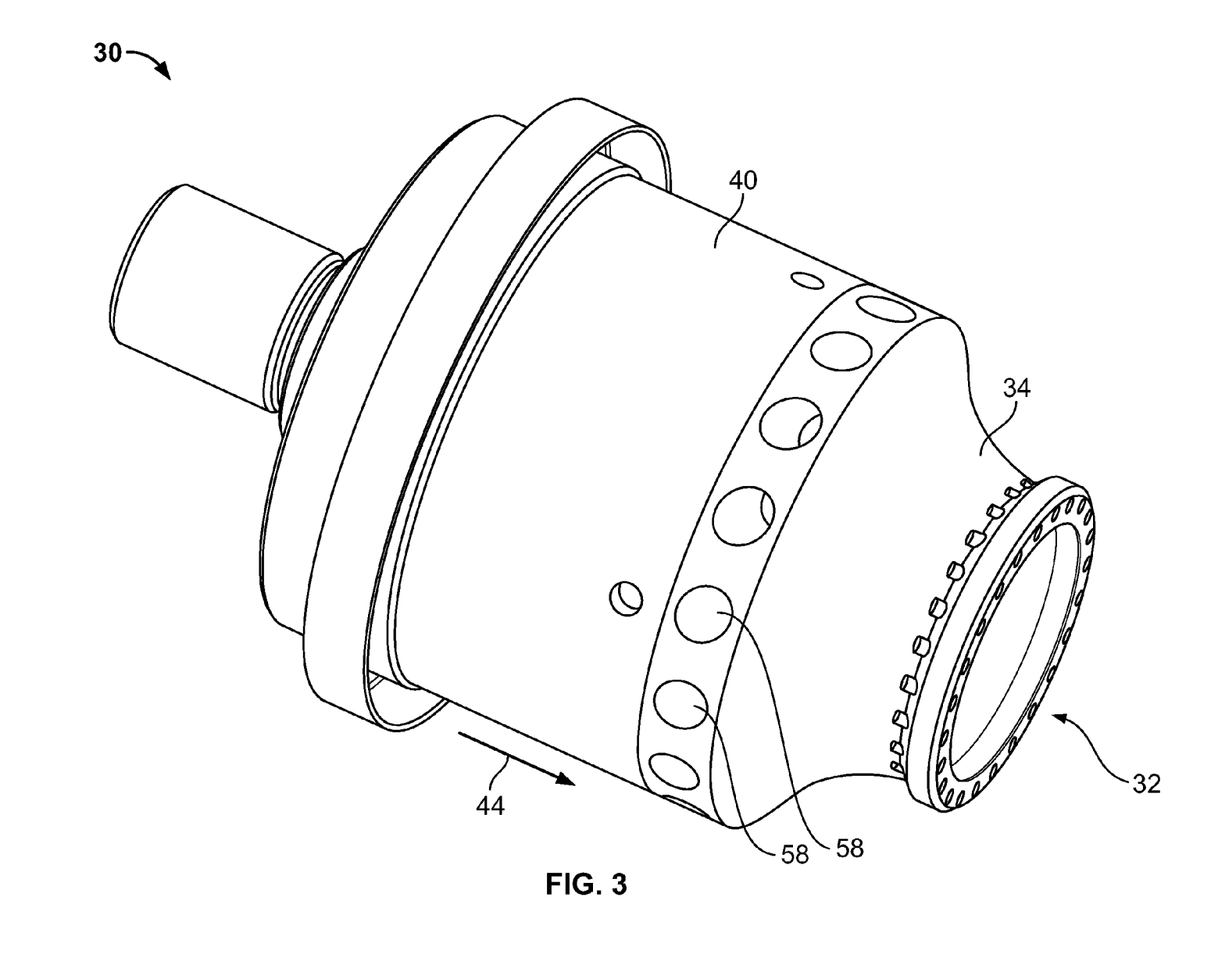
FIG. 3 is a perspective view of an exemplary fuel nozzle tip that may be used with the gas turbine engine shown in FIG. 2.
Figure 4:
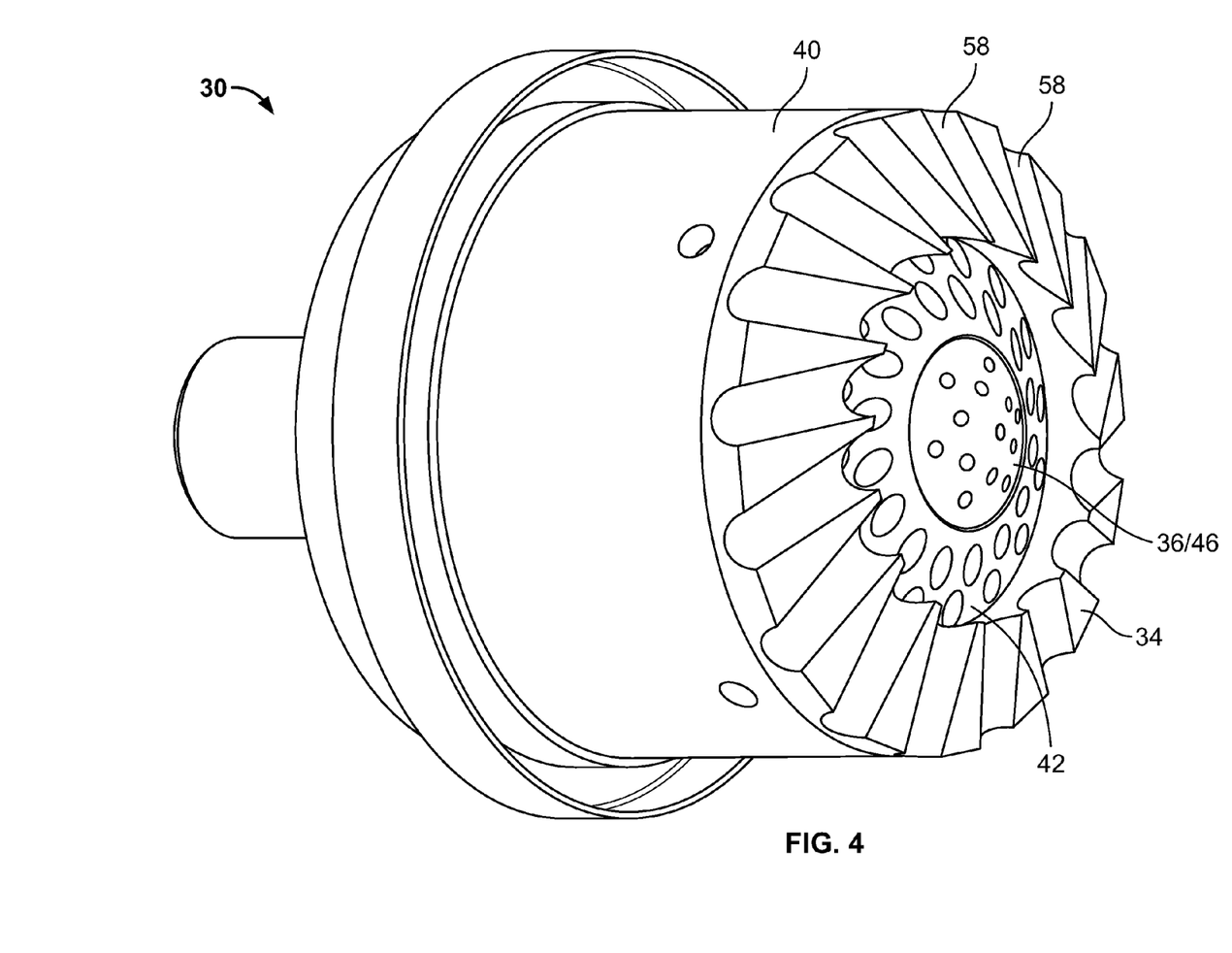
FIG. 4 is an internal view of the fuel nozzle tip shown in FIG. 3.
Figure 5:
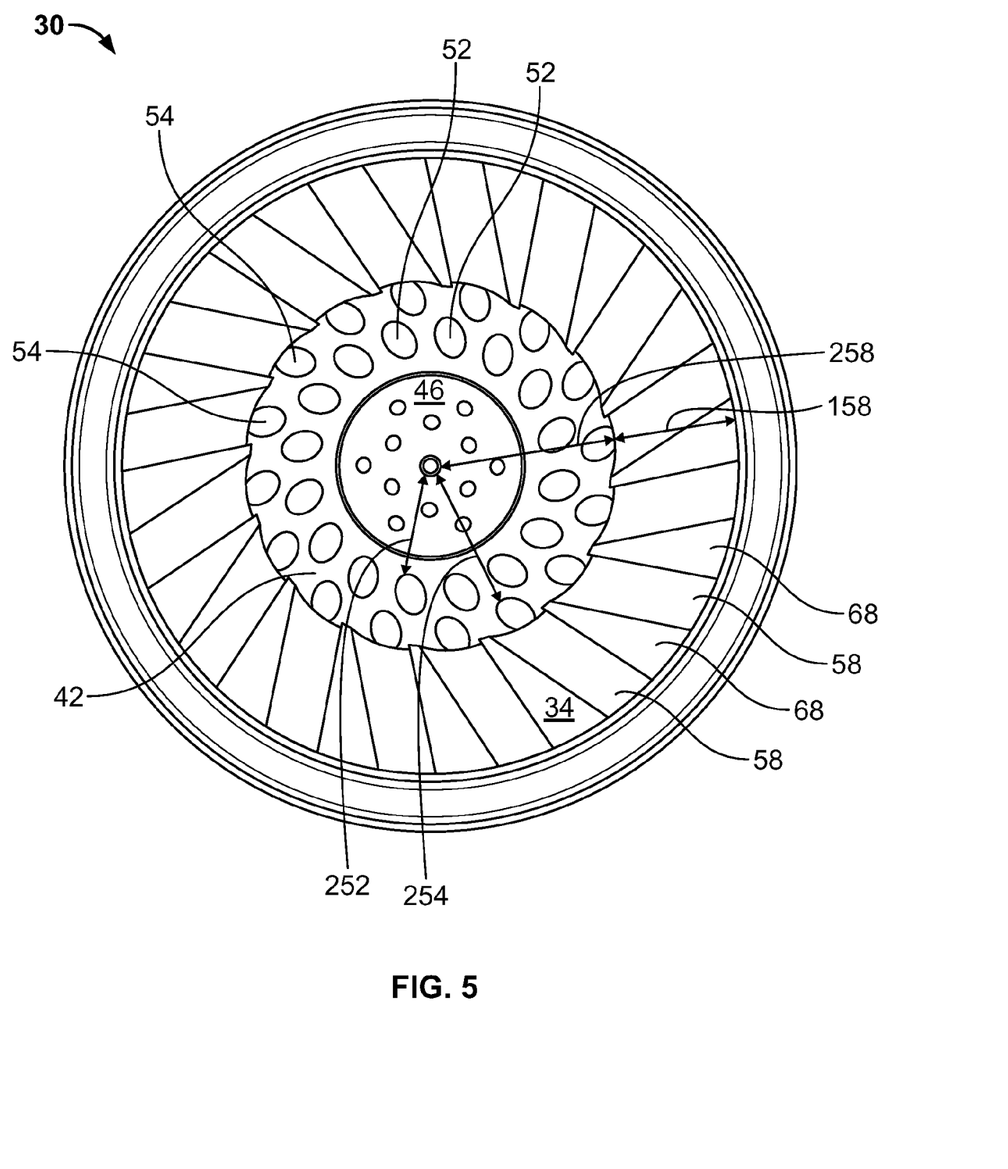
FIG. 5 is an end view of the fuel nozzle tip shown in FIG. 3.
Figure 6:
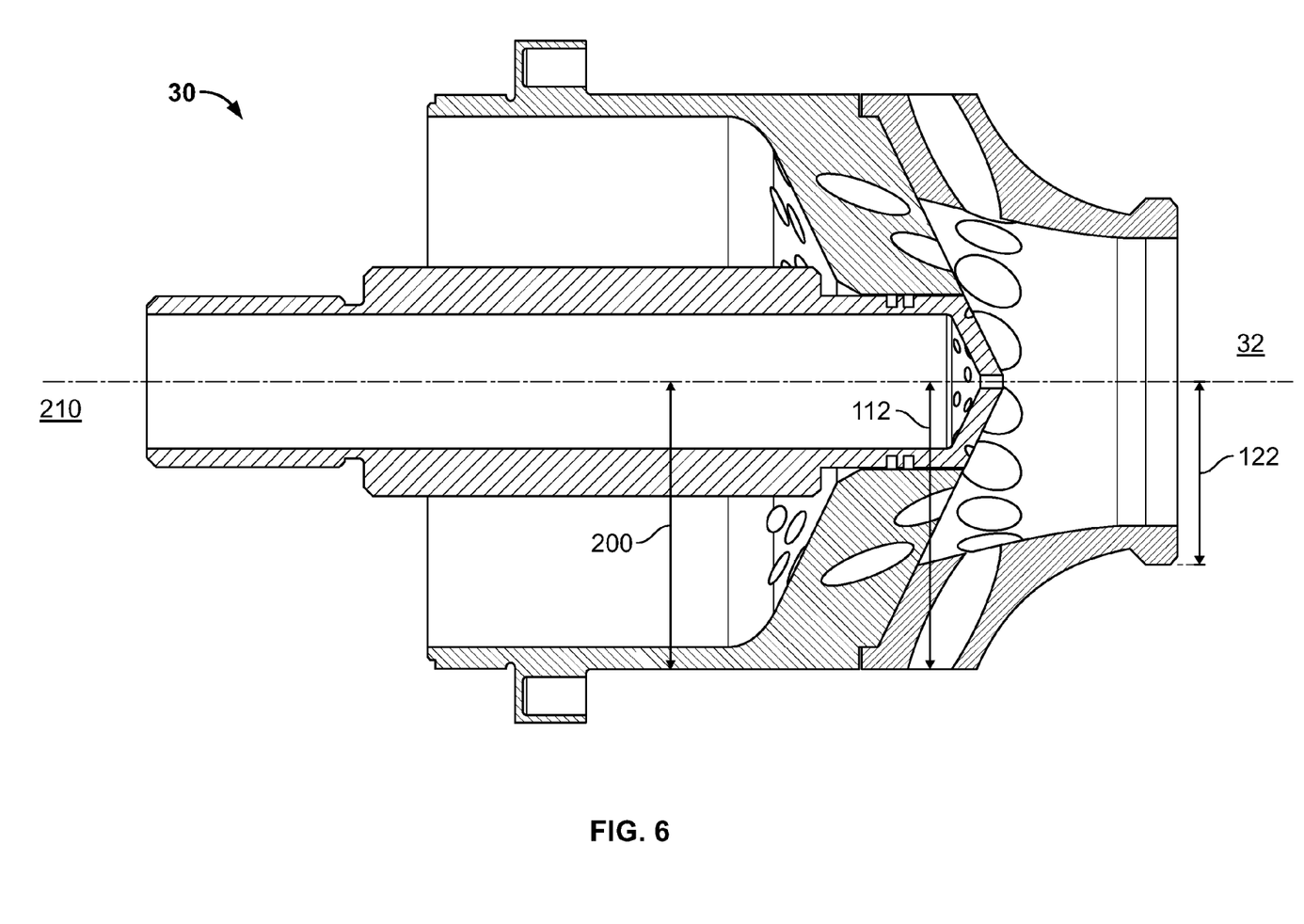
FIG. 6 is a cross-sectional view of the fuel nozzle tip shown in FIG. 3.

FIGS. 3-6 illustrate an exemplary fuel nozzle tip 30 that maybe used with combustor 16 (shown in FIG. 2). More specifically, FIG. 3 illustrates a perspective view of fuel nozzle tip 30, FIG. 4 illustrates an internal view of fuel nozzle tip 30, FIG. 5 illustrates an end view of fuel nozzle tip 30; and FIG. 6 illustrates a cross-sectional view of fuel nozzle tip 30.

In the exemplary embodiment, fuel nozzle tip 30 is positioned at a downstream end 44 of an associated fuel nozzle (not shown). Moreover, in the exemplary embodiment, fuel nozzle tip 30 includes an air collar 34, a pilot fuel tube 36, and a primary fuel tube 40. More specifically, in the exemplary embodiment, primary fuel tube 40 is radially outward from, and extends circumferentially about, pilot fuel tube 36. In the exemplary embodiment, air collar 34 is coupled to a fuel tube face 42 at downstream end 44.

Air collar 34 is formed with a first outer diameter 112 adjacent to fuel tube face 42. In the exemplary embodiment, first outer diameter 112 is approximately the same size as an outer diameter 200 of primary fuel tube 40. In the exemplary embodiment, air collar 34 is also formed with, downstream from first outer diameter 112, a second outer diameter 122 that is smaller than first outer diameter 112. As such, second outer diameter 122 enables air collar 34 to slide axially proximate to combustor mixing zone 32.

Fuel tube face 42 of primary fuel tube 40 includes at least a first plurality of circumferentially-spaced primary fuel openings 52. In the exemplary embodiment, fuel tube face 42 also includes a second plurality of circumferentially-spaced primary fuel openings 54 to enable primary fuel tube 40 to discharge a larger volume of fluid into combustor mixing zone 32. In the exemplary embodiment, primary fuel openings 52 and 54 are substantially circular. Alternatively, openings 52 and/or 54 may be formed with any cross-sectional shape that enables primary fuel tube 40 to function as described herein. In the exemplary embodiment, primary fuel openings 52 and 54 are spaced substantially concentrically and circumferentially about a centerline 210 of fuel nozzle tip 30. More specifically, in the exemplary embodiment, primary fuel openings 52 are spaced at a first radial distance 252 outward from centerline 210, and primary fuel openings 54 are spaced at a second radial distance 254 outward from centerline 210. In the exemplary embodiment, first radial distance 252 is shorter than second radial distance 254.

In the exemplary embodiment, primary fuel openings 52 and 54 discharge a fluid (not shown) into combustor mixing zone 32. More specifically, in the exemplary embodiment, primary fuel openings 52 and 54 discharge a primary fuel (not shown), such as an air blown gasifier syngas, into combustor mixing zone 32. More specifically, primary fuel openings 52 and 54 discharge primary fuel at a predefined discharge angle $\theta_1$ that is obliquely oriented with respect to centerline 210. In the exemplary embodiment, discharge angle $\theta_1$ is between about 10° to about 30°. In one embodiment, discharge angle $\theta_1$ of at least one fuel opening 54 is different from discharge angle $\theta_1$ of at least one fuel opening 52.

A pilot fuel tube face 46 includes a plurality of pilot fuel openings 48. In the exemplary embodiment, pilot fuel openings 48 are substantially circular. Alternatively, pilot fuel openings 48 may be formed with any cross-sectional shape that enables pilot fuel tube 36 to function as described herein. In the exemplary embodiment, pilot fuel openings 48 discharge a fluid into combustor mixing zone 32. More specifically, in the exemplary embodiment, pilot fuel openings 48 discharge a pilot fuel (not shown) or a startup fuel into combustor mixing zone 32. More specifically, pilot fuel openings 48 discharge pilot fuel at a predefined discharge angle (not shown) that is obliquely oriented with respect to centerline 210.

Air collar 34 includes a plurality of circumferentially-spaced air openings 58. In the exemplary embodiment, discharging air through openings in air collar 34, rather than openings in fuel tube face 42, enables discharging a larger volume of primary fuel through primary fuel openings 52 and/or 54. In the exemplary embodiment, air openings 58 are substantially circular. Alternatively, air openings 58 may be formed with any cross-sectional shape that enables air openings 58 to function as described herein. In the exemplary embodiment, air openings 58 are spaced substantially circumferentially about centerline 210. More specifically, in the exemplary embodiment, air openings 58 are spaced at a radial distance 258 outward from centerline 210. In the exemplary embodiment, radial distance 258 is greater than radial distances 252 and 254.

In the exemplary embodiment, air openings 58 discharge fluid into combustor mixing zone 32. More specifically, in the exemplary embodiment, air openings 58 discharge air into combustor mixing zone 32. More specifically, air openings 58 discharge air at a predefined discharge angle $\theta_2$ that is obliquely oriented with respect to centerline 210. In the exemplary embodiment, discharge angle $\theta_2$ is between about 10° to about 30°. A thickness 158 of air collar 34 enables air to be discharged at discharge angle $\theta_2$ while defining a separation 68 circumferentially adjacent between air openings 58. In the exemplary embodiment, discharge angle $\theta_1$ and discharge angle $\theta_2$ are approximately equal. Alternatively, discharge angles $\theta_1$ and $\theta_2$ may be at any angle that enables a fuel-air mixture as described herein.

During operation, pilot fuel tube 36 discharges pilot fuel or startup fuel to combustor mixing zone 32 during start-up and idle operations of engine 10. In the exemplary embodiment, the startup fuel is natural gas. When additional power is demanded, pilot fuel tube 36 discontinues discharging pilot fuel to combustor mixing zone 32, and primary fuel tube 40 and air collar 34 discharge primary fuel and air, respectively, to combustor mixing zone 32. Primary fuel openings 52 and 54 discharge fuel at discharge angle $\theta_1$, and air openings 58 discharge air at discharge angle $\theta_2$. More specifically, the swirling and mixing of primary fuel and air discharged from primary fuel openings 52 and 54 and air openings 58 facilitate the generation of a swirl number below a tipping point of 0.4 within combustor mixing zone 32. In the exemplary embodiment, the swirl number of the fuel-air mixture is less than about 0.4. More specifically, in the exemplary embodiment, the swirl number of the discharged fuel is less than about 0.4, and the swirl number of the discharged air is less than about 0.4. The swirl number, as used in the present application, is defined as an axial flux of angular momentum relative to axial thrust. The weak swirl facilitates gently expanding fuel and air in a radial direction, thus reducing a probability of a vortex breakdown. In other words, the weak swirl reduces a probability of producing a recirculation zone near a centerline of the swirl. Moreover, the weak swirl facilitates gently expanding fuel and air in an axial direction from downstream end 44 towards combustor 16. As a result, a flame is facilitated to be attached further downstream than would be possible with a strong swirl. Attaching the flame further downstream from fuel nozzle tip 30 facilitates reducing an operating temperature of fuel nozzle tip 30. Moreover, the circular shape of each air opening 58 enables a rich flame to be created such that a probability of flame-holding is reduced.

The methods and systems described herein facilitate discharging a fuel-air mixture that enables a rich flame to be produced while reducing flame-holding issues. Specifically, the orientation of the pilot fuel openings, the primary fuel plurality of openings, and air openings within the fuel nozzle tip facilitate discharging a mixture of fuel and air with a weak swirl within a mixing zone. In the exemplary embodiment, the airblown syngas fuel nozzles are used in a refinery or a coal gasification plant. The methods and systems described herein illustrate the disclosure by way of example and not by way of limitation. The description clearly enables one skilled in the art to make and use the disclosure, describes several embodiments, adaptations, variations, alternatives, and uses of the disclosure, including what is presently believed to be the best mode of carrying out the disclosure.

Exemplary embodiments of the airblown syngas fuel nozzle with circular diluent air openings and a method of assembling the same are described above in detail. The methods and systems are not limited to the specific embodiments described herein, but rather, components of the methods and systems may be utilized independently and separately from other components described herein. For example, the methods and systems described herein may have other industrial and/or consumer applications and are not limited to practice with refineries or coal gasification plants as described herein. Rather, the present invention can be implemented and utilized in connection with many other industries.

While the invention has been described in terms of various specific embodiments, those skilled in the art will recognize that the invention can be practiced with modification within the spirit and scope of the claims.

What is claimed is:

1. A method of assembling a fuel nozzle tip for use with a combustor, wherein said method comprises:
    providing a fuel tube formed with a first plurality of circumferentially-spaced fuel openings and a second plurality of circumferentially-spaced fuel openings, wherein the fuel tube is oriented such that fuel may be discharged into a mixing zone defined within the combustor through the first and second pluralities of fuel openings; and
    coupling an air collar to the fuel tube, wherein the air collar is formed with a plurality of circumferentially-spaced substantially circular air openings, wherein the air collar encloses a zone immediately upstream of the mixing zone and is oriented such that air is discharged into the mixing zone through the plurality of air openings, wherein the air openings extend from an outer surface of the air collar adjacent an upstream end of the air collar to an inner surface of the air collar, and wherein the air openings are downstream and spaced apart from a front face of the fuel tube, and wherein the air collar is coupled to the front face of the fuel tube.

2. A method in accordance with claim 1, wherein providing a fuel tube further comprises providing the fuel tube such that fuel may be discharged into the mixing zone through at least one of the first and second pluralities of fuel openings at a discharge angle that is obliquely oriented with respect to a centerline of the fuel nozzle tip.

3. A method in accordance with claim 1, wherein coupling an air collar further comprises coupling the air collar to the fuel tube such that air may be discharged into the mixing zone through at least one of the plurality of air openings at a discharge angle that is obliquely oriented with respect to a centerline of the fuel nozzle tip.

4. A method in accordance with claim 1, wherein coupling an air collar further comprises coupling the air collar to the fuel tube such that at least one of the first and second pluralities of fuel openings and the plurality of air openings is oriented to facilitate generating a swirl number of less than 0.4 within the mixing zone.

5. A method in accordance with claim 1, wherein providing a fuel tube further comprises providing the fuel tube wherein the first and second pluralities of fuel openings are substantially concentric about a centerline of the fuel nozzle tip.

6. A method in accordance with claim 1, wherein providing a fuel tube further comprises orienting the fuel tube to circumferentially extend about a pilot tube, wherein the pilot tube is configured to channel a pilot fuel into the mixing zone.

7. A fuel nozzle tip for use with a combustor, said fuel nozzle tip comprising:
    a fuel tube comprising a first plurality of circumferentially-spaced fuel openings and a second plurality of circumferentially-spaced fuel openings, said fuel tube configured to channel fuel into a mixing zone defined within the combustor; and
    an air collar coupled to said fuel tube, said air collar enclosing a zone immediately upstream of the mixing zone and comprising a plurality of circumferentially-spaced substantially circular air openings configured to discharge air into said mixing zone, said air openings extending from an outer surface of an upstream end of said air collar to an inner surface of said air collar, wherein the air openings are downstream and spaced apart from a front face of the fuel tube, and wherein the air collar is coupled to the front face of the fuel tube.

8. A fuel nozzle tip in accordance with claim 7, wherein at least one of said first and second pluralities of fuel openings is configured to discharge fuel into said mixing zone at a discharge angle that is obliquely oriented with respect to a centerline of said fuel nozzle tip.

9. A fuel nozzle tip in accordance with claim 7, wherein at least one of said plurality of air openings is configured to discharge air into said mixing zone at a discharge angle that is obliquely oriented with respect to a centerline of said fuel nozzle tip.

10. A fuel nozzle tip in accordance with claim 7, wherein at least one of said first and second pluralities of fuel openings and said plurality of air openings is oriented to facilitate generating a swirl number of less than 0.4 within said mixing zone.

11. A fuel nozzle tip in accordance with claim 7, wherein said first and second pluralities of fuel openings are substantially concentric about a centerline of the fuel nozzle tip.

12. A fuel nozzle tip in accordance with claim 7, wherein said fuel tube circumscribes a pilot fuel tube that is configured to channel a pilot fuel into said mixing zone.

13. A fuel nozzle tip in accordance with claim 7, wherein at least one of said first and second pluralities of fuel openings is configured to channel fuel at a discharge angle between about 10° and 30° and at least one of said plurality of air openings is configured to channel air at a discharge angle between about 10° and 30°.

14. A gas turbine engine for use in an integrated gasification combined-cycle (IGCC) power generation system, the gas turbine engine comprising:
a combustor; and
a fuel nozzle tip that comprises:
a fuel tube comprising a first plurality of circumferentially-spaced fuel openings and a second plurality of circumferentially-spaced fuel openings, said fuel tube configured to channel fuel into a mixing zone defined within the combustor; and
an air collar coupled to said fuel tube, said air collar enclosing a zone immediately upstream of the mixing zone and comprising a plurality of circumferentially-spaced substantially circular air openings configured to discharge air into said mixing zone, said air openings extending from an outer surface of an upstream end of said air collar to an inner surface of said air collar, wherein the air openings are downstream and spaced apart from a front face of the fuel tube, and wherein the air collar is coupled to the front face of the fuel tube.

15. A gas turbine engine in accordance with claim 14, wherein at least one of said first and second pluralities of fuel openings is configured to discharge fuel into said mixing zone at a discharge angle that is obliquely oriented with respect to a centerline of said fuel nozzle tip.

16. A gas turbine engine in accordance with claim 14, wherein at least one of said plurality of air openings is configured to discharge air into said mixing zone at a discharge angle that is obliquely oriented with respect to a centerline of said fuel nozzle tip.

17. A gas turbine engine in accordance with claim 14, wherein at least one of said first and second pluralities of fuel openings and said plurality of air openings is oriented to facilitate generating a swirl number of less than 0.4 within said mixing zone.

18. A gas turbine engine in accordance with claim 14, wherein said first and second pluralities of fuel openings are substantially concentric about a centerline of the fuel nozzle tip.

19. A gas turbine engine in accordance with claim 14, wherein said fuel tube circumscribes a pilot fuel tube that is configured to channel a pilot fuel into said mixing zone.

20. A gas turbine engine in accordance with claim 14, wherein at least one of said first and second pluralities of fuel openings is configured to channel fuel at a discharge angle between about 10° and 30° and at least one of said plurality of air openings is configured to channel air at a discharge angle between about 10° and 30°.

\* \* \* \* \*